United States Patent
Thas et al.

(10) Patent No.: US 7,007,597 B1
(45) Date of Patent: Mar. 7, 2006

(54) VIBRATOR ASSEMBLY FOR STRAPPING MACHINE WELD HEAD

(75) Inventors: Wayne J. Thas, Arlington Heights, IL (US); Timothy B. Pearson, Antioch, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/950,952

(22) Filed: Sep. 27, 2004

(51) Int. Cl.
*B65B 13/32* (2006.01)

(52) U.S. Cl. .............................. 100/33 PD; 53/375.9; 53/589; 156/73.5; 156/73.6

(58) Field of Classification Search .............. 100/33 R, 100/33 PB; 53/375.9, 589; 156/73.5, 73.6
See application file for complete search history.

(56) References Cited

U.S. PATENT DOCUMENTS

| | | | | |
|---|---|---|---|---|
| 4,776,905 | A | * | 10/1988 | Cheung et al. ............ 156/73.5 |
| 4,892,768 | A | * | 1/1990 | Cheung et al. ............... 428/57 |
| 6,532,722 | B1 | * | 3/2003 | Gerhart et al. ................ 53/589 |
| 6,848,241 | B1 | * | 2/2005 | Lopez .......................... 53/589 |

\* cited by examiner

*Primary Examiner*—Derris H. Banks
*Assistant Examiner*—Jimmy Nguyen
(74) *Attorney, Agent, or Firm*—Mark W. Croll, Esq.; Donald J. Breh, Esq.; Welsh & Katz, Ltd.

(57) ABSTRACT

A vibrator assembly is for use on a strapping head for a strapping machine configured to position, tension and seal strapping material around a load. The strapping head includes a body, an anvil, and a welding motor having a rotating output shaft. The vibrator assembly includes an eccentric element operably mounted to the welding motor output shaft for rotation therewith. A bearing is disposed about the eccentric element, A housing is houses the eccentric element and bearing at least in part within the housing. The housing defines a cup-shaped well having a first axis length and a second axis length. The first axis length is longer than the second axis length. The first axis length is in a transverse direction, and the second axis length is in an oscillating direction. The bearing is restrained in the oscillating direction. A weld pad is operably connected to the housing by a link. As the motor output shaft rotates, the eccentric element is rotated and in turn rotates the bearing to impart oscillating motion to the weld pad in the oscillating direction. The bearing is restrained from moving in the transverse direction.

12 Claims, 2 Drawing Sheets

VIBRATOR ASSEMBLY FOR STRAPPING MACHINE WELD HEAD

BACKGROUND OF THE INVENTION

The present invention pertains to strapping machine weld head vibrator assemblies. More particularly, the present invention pertains to vibrator assemblies having a simplified, one-link design.

Strapping machines are well known in the art. Typically these machines are used for securing straps around loads. One type of strapper is used with a plastic or polymeric strap and is a stationary arrangement in which the strapper is included as part of an overall manufacturing or packaging system.

A typical strapper includes a frame to which various components are mounted. A chute is mounted to the frame through which the strapping material is fed around a load. A strapping head and a drive or feed mechanism are mounted to the frame. The strapping material is fed from a source, by the feed assembly, through the strapping head. The strapping material traverses around the chute and back to the strapping head.

The strapping or welding head provides a number of functions. The strapping head grips the strap during the course of a strapping operation and cuts the strap from a strap source or supply. In addition, the strapping head includes a sealer to seal an overlying course of strapping material onto itself. This seal is commonly referred to as a weld and is effected by heating one course of the strap by use of a vibrating element.

Known strapping heads include a body and an anvil between which the courses of strap materials traverse during a strapping operation and between which the strapping material courses are held during the welding operation. The anvil is maintained rigid and a weld pad is brought into contact and applies pressure against the strap. The pad is carried by an element that oscillates or vibrates (and oscillates the pad) thus creating friction and heat to effect the weld.

The drive for the vibrating element and pad is typically a motor or other rotational drive. In order to impart vibrational motion to the element, the rotational motion of the motor must be transferred to linear motion. Known strappers include complex linkages or eccentric shaft arrangements having open (elongated) slots. While these arrangements function well for their intended purposes (and particularly the eccentric arrangement), there are drawbacks. For example, as with any complex linkage, problems can occur at the linkage joints. As to the eccentric configurations, there is always the potential for debris to accumulate in the elongated slot (that receives the eccentric shaft). Such an eccentric-containing configuration is disclosed in Gerhart et al., U.S. Pat. No. 6,532,722.

Accordingly, there exists a need for a simplified assembly for a welding or strapping head weld pad. Desirably, such an assembly eliminates the need for complex linkages and open regions otherwise required to transfer rotational motion into linear motion. More desirably, such an assembly is of a compact design and readily permits removal for tool maintenance and inspection.

BRIEF SUMMARY OF THE INVENTION

A vibrator assembly is for use with a strapping machine strapping or weld head. The strapping machine positions, tensions and seals strapping material around a load. The strapping head includes a body, an anvil, and a welding motor having a rotating output shaft.

The vibrator assembly is a simplified design that eliminates the need for complex linkages and open regions otherwise required to transfer rotational motion into linear motion. Such an assembly is of a compact design and readily permits removal for tool maintenance and inspection.

The vibrator assembly includes an eccentric element operably mounted to the welding motor output shaft for rotation with the shaft. A bearing is disposed about the eccentric element.

The eccentric element and bearing are disposed, at least in part, within a housing. The housing defines a cup-shaped well, preferably, oval in shape. That is, the well has a first axis length and a second axis length with the first axis length being longer than the second axis length and with the first axis length being in a transverse direction. Conversely, the second axis length is in an oscillating direction. The bearing is restrained in the oscillating direction.

A weld pad is operably connected to the housing by a link, such as a pin. As the motor output shaft rotates, the eccentric element is rotated and in turn rotates the bearing to impart oscillating motion to the weld pad in the oscillating direction. The bearing is restrained from moving in the transverse direction. In a present assembly, friction reducing elements are disposed in the well, in recesses formed in the housing along the second axis, for contact with the bearing.

Preferably, a seal is disposed on the eccentric element for cooperating with the housing to enclose the bearing and housing well. A key is disposed on the weld pad and mating keyway is disposed on the housing to restrain the weld pad from pivoting about the link relative to the housing.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
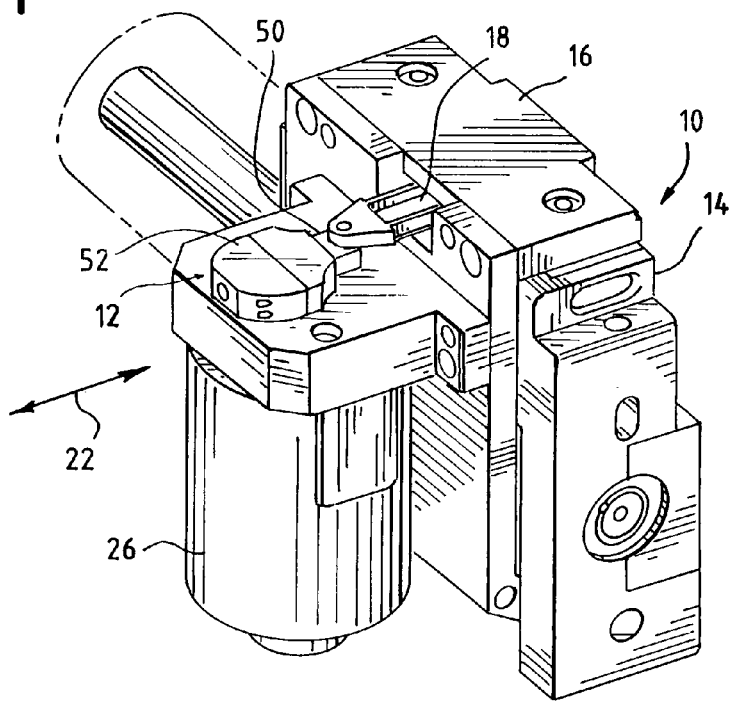
FIG. 1 is a perspective view of an exemplary strapping head having a vibrator assembly embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular FIG. 1, there is shown a strapping machine strapping or weld head 10 having a vibrator assembly 12, embodying the principles of the present invention. The strapping head 10 includes generally, a body 14 and an anvil 16. Internally, (not shown) a gripper assembly and a cutter are carried by the body 14. As set forth in the above patent to Gerhart et al., the cutter can be disposed within the gripper assembly. The Gerhart et al. patent which is commonly assigned with the present application is incorporated herein by reference.

Figure 4:
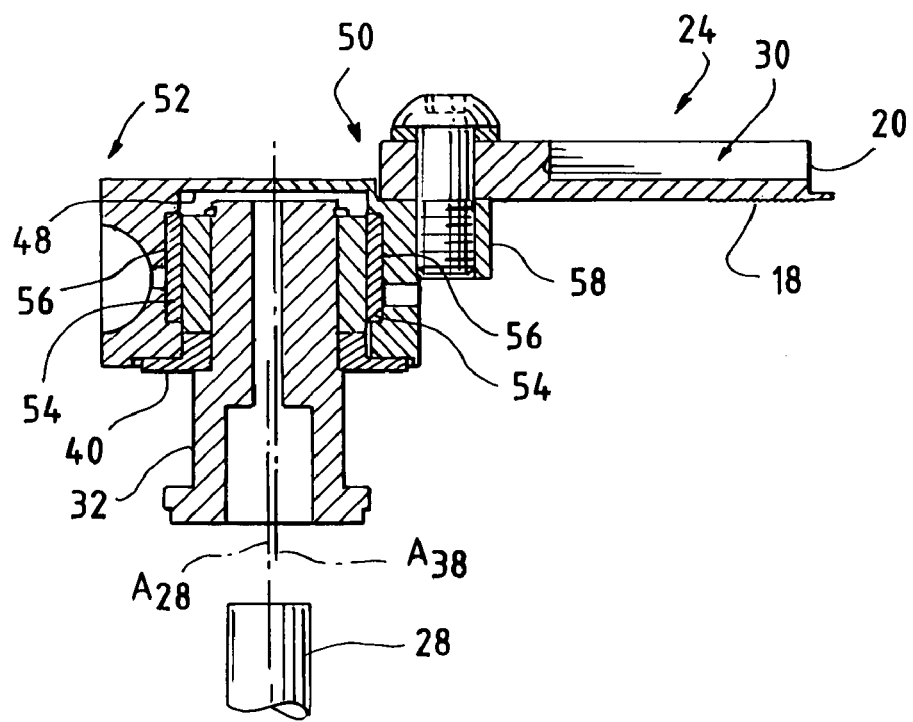
FIG. 4 is a cross-sectional view taken along line 4—4 of FIG. 3.

In a typical strapper, the strap is welded to itself by the action of a vibrating element or weld pad 18. The pad 18 is carried by a carriage 20 that is moved in a linear or reciprocating motion so as to fuse (by heat) the strap layer in contact with the pad 18 with an adjacent, confronting strap layer. The pad 18 can also be formed as part of the carriage 20 (e.g., formed on a bottom surface of the carriage 20 as seen in FIG. 4) as a unitary vibrator element 24. The carriage 20 and pad 18 together serve as the vibrator element 24.

In order to provide linear movement to the element 24, the strapping head 10 includes a weld or sealer motor 26. The motor 26 has a rotating output shaft 28 that is operably connected to the element 24 by the vibrator assembly 12. To achieve the friction necessary to form the strap seal, the element 24 moves at a rate of about 10,000 to 15,000 movements or cycles per minute.

Known connecting arrangements use a crank-type connecting rod extending between an eccentric pivot and the pad. The rod uses two pins as links for transferring rotational movement of the motor into reciprocating movement of the pad. One pin is on the carriage and the other pin is on the eccentric shaft.

Figure 2:
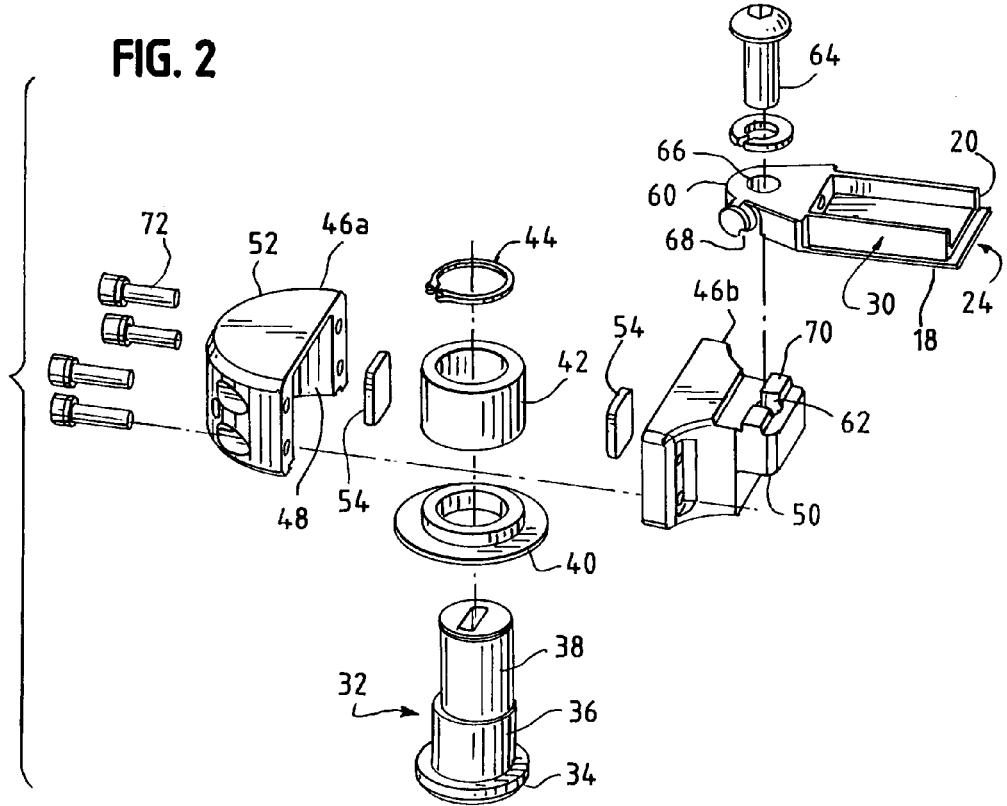
FIG. 2 is an exploded view of the assembly and weld pad of FIG. 1.

The physical distance between the pad and the eccentric is short. As such, the angle that the connecting rod rotates through is large (steep). The steep angle results in large side loads that are induced on the pivot points of the connecting rod and on the linear bearings (not shown but located as indicated at about 30 in FIG. 2) of the pad (the linear bearings are positioned between the sides of the pad and the carriage). These side loads result in high frictional forces and loses. It was found that this required overly frequent bearing and pivot pin lubrication for even minimal use. It was further found that even with proper lubrication the 10,000 cycle per minute rate and the heat generated by the motor resulted in excessive component aging and wear, and failure could occur as frequently as within 10,000–15,000 cycles.

To overcome these friction-related problems, the present vibrator assembly 12 eliminates the crank-type connection. An eccentric cap 32 is fitted onto the motor output shaft 28. The cap 32 has a stepped configuration with a base flange 34, a central, concentric cylindrical portion 36 (concentric with the flange 34 and motor shaft 28) and an eccentric stub 38. The stub 38 is cylindrical, however, the longitudinal axis $A_{38}$ of the stub 38 is offset from the longitudinal axis $A_{28}$ of the motor shaft 28, flange 34 and central portion 36. A seal 40 is fitted over the cap 32 around the central portion 36, resting on the flange 34.

A bearing 42 is fitted onto the eccentric stub 38 and is retained on the stub 38 by a retaining clip or ring 44. In a present assembly 12, the bearing 42 is a needle-type bearing that is formed as a sleeve that fits onto the eccentric stub 38. In this manner, although the bearing 42 and stub 38 are concentric with one another, their shared axis (at $A_{38}$) is offset from the longitudinal axis $A_{28}$ of the motor shaft 28, flange 34 and central portion 36.

Figure 3:
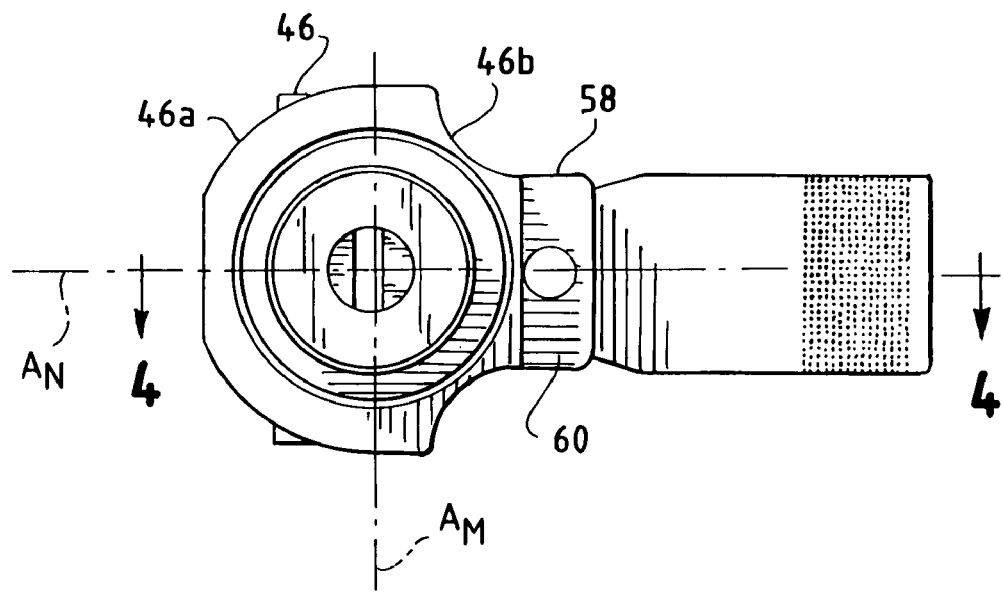
FIG. 3 is a top view of the assembly of FIG. 1.

The bearing 42 is retained within a bearing housing 46. The bearing housing 46 defines an inner cup-like portion or well 48 in which the bearing 42 is positioned. As best seen in FIG. 3, the well 48 has an elongated profile, being slightly oval-shaped. The major axis $A_M$ is in the side-to-side direction and the minor axis $A_N$ is in the front-to-rear (50-to-52, respectively) direction. That is, the well is slightly larger side-to-side than it is front-to-back (where front-to-back is the direction of reciprocation as indicated by the arrow at 22). Pads 54 are positioned within the well 48 at the front 50 and rear 52 for "holding" the bearing 42 in place in the housing 46 and to reduce the friction developed by the rotating bearing 42. The pads 54 are fitted into recesses or channels 56 in the housing 46.

A present housing 46 is a two-part shell. A rear part 46a of the shell forms a heel and a front portion 46b of the shell has a connecting finger 58 that extends toward the element 24. The finger 58 defines a connecting portion 60 having an opening 62 therein. A pin (such as a screw) 64 extends through the finger opening 62 and a cooperating opening 66 in the element 24. This forms a single pin link between the eccentric 32 and the element 24. The finger 58 includes a keyway or channel 68 that cooperates with a key 70 formed in the base of the element 24. This prevents the element 24 from rotating relative to the housing 46 about the pin 64, and thus rigidly secures the housing 46 and element 24 to one another.

The front and rear housing parts 46a,b are secured to one another by a plurality of fasteners 72. The entirety of the housing 46 serves as a grease pot. That is, the housing well 48 is filled with lubricant to provide lubrication for the bearing 42. In that the well 48 is oval rather than circular, there is space between the bearing 42 and the wall of the housing 46 that also serves as a region for accumulating lubricant. The seal 40 at the base of the housing 46 (around the central portion 36 of the cap 32), closes off and seals the housing 46. As a result of the oscillating action of the bearing 42 relative to the housing 46, the lubricant is forced around the housing 46 and into the bearing 42 to provide an albeit minimally, pumped or forced lubricant circulating system.

The present vibrator assembly 12 has a number of advantages over the crank connecting rod assembly configuration. First, the keyed 68, 70 arrangement of the element 24 and housing 46 eliminates a needle bearing, a pivot pin, and additional components that would otherwise require lubrication. In that the element 24 is restrained from moving in the side-to-side direction and is restrained from pivoting (about the pin 64), less side loads are induced on the linear bearings (those bearings between the element 24 and the head 10 at the anvil).

Moreover, because the well 48 within the housing 46 is oval shaped, the space between the housing 46 and the bearing 42 permits applying more lubricant around the bearing 42 than would a tight-fitting arrangement. This, in conjunction with the seal 40, shelters the bearing 42 and lubricant from contaminants.

In addition, the carbide pads or blanks 54 that are pocketed into the front and rear of the housing 46 facilitate changing the orbital motion of the eccentric 32 into linear motion with less friction. This in turn results in less heat produced by the motor 26 and increases the life expectancy of the motor 26 and all of the moving components attached to the vibrator assembly 12. The present assembly 12 has been subjected to in excess of 150,000 cycles with no additionally required lubrication and no component failures.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A vibrator assembly for a strapping head for a strapping machine configured to position, tension and seal strapping material around a load, the strapping head including a body, an anvil, and a welding motor having a rotating output shaft, the vibrator assembly comprising:
    an eccentric element operably mounted to the welding motor output shaft for rotation therewith;
    a bearing disposed about the eccentric element;
    a housing, the eccentric element and the bearing disposed at least in part within the housing, the housing defining a cup-shaped well therein, the well having a first axis length and a second axis length, the first axis length being longer than the second axis length, the first axis length being in a transverse direction, and the second axis length being in an oscillating direction, the bearing being restrained in the oscillating direction relative to the housing;
    a weld pad operably connected to the housing by a link, wherein as the motor output shaft rotates, the eccentric element is rotated and in turn rotates the bearing to impart oscillating motion to the weld pad in the oscillating direction, and wherein the bearing is restrained from moving in the transverse direction; and a key and a mating keyway one disposed on the housing and the other disposed on the weld pad to restrain the weld pad from pivoting about the link relative to the housing.

2. The vibrator assembly in accordance with claim 1 including a seal disposed on the eccentric element configured for cooperating with the housing to enclose the bearing and well.

3. The vibrator assembly in accordance with claim 1 wherein the key is disposed on the housing and the keyway is disposed on the weld pad.

4. The vibrator assembly in accordance with claim 1 wherein the housing well has an oval shape.

5. The vibrator assembly in accordance with claim 1 wherein the link operably connecting the weld pad to the housing is a pin fitted in respective openings in the housing and the weld pad.

6. The vibrator assembly in accordance with claim 1 including friction reducing elements disposed in the well for contact with the bearing.

7. The vibrator assembly in accordance with claim 6 wherein the friction reducing elements are disposed in recesses formed in the housing along the second axis.

8. A vibrator assembly for a strapping head for a strapping machine configured to position, tension and seal strapping material around a load, the strapping head including a body, an anvil, and a welding motor having a rotating output shaft, the vibrator assembly comprising:
    an eccentric element operably mounted to the welding motor output shaft for rotation therewith;
    a bearing disposed about the eccentric element;
    a housing, the eccentric element and the bearing disposed at least in part within the housing, the housing defining a cup-shaped well therein having an oval shape having a first axis length and a second axis length, the first axis length being longer than the second axis length, the first axis length being in a transverse direction, and the second axis length being in an oscillating direction, the bearing being restrained in the oscillating direction relative to the housing;
    friction reducing elements disposed in the well, in recesses formed in the housing, for contact with the bearing, the friction reducing elements are disposed along the second axis;
    a seal disposed on the eccentric element configured for cooperating with the housing to enclose the bearing and well; and
    a weld pad operably connected to the housing by a link, wherein as the motor output shaft rotates, the eccentric element is rotated and in turn rotates the bearing to impart oscillating motion to the weld pad in the oscillating direction, and wherein the bearing is restrained from moving in the transverse direction.

9. The vibrator assembly in accordance with claim 8 including a key disposed on the weld pad and a mating keyway disposed on the housing to restrain the weld pad from pivoting about the link relative to the housing.

10. A strapping head for a strapping machine configured to position, tension and seal strapping material around a load, comprising:
    a body;
    an anvil;
    a welding motor having a rotating output shaft;
    a vibrator assembly having an eccentric element operably mounted to the welding motor output shaft for rotation therewith, a bearing disposed about the eccentric element, a housing having the eccentric element and the bearing disposed at least in part therein, the housing defining a cup-shaped well having a first axis length and a second axis length, the first axis length being longer than the second axis length, the first axis length being in a transverse direction, and the second axis length being in an oscillating direction, the bearing being restrained in the oscillating direction relative to the housing;
    a weld pad operably connected to the housing by a link, wherein as the motor output shaft rotates, the eccentric element is rotated and in turn rotates the bearing to impart oscillating motion to the weld pad in the oscillating direction, and wherein the bearing is restrained from moving in the transverse direction; and
    a key disposed on the weld pad and a mating keyway disposed on the housing to restrain the weld pad from pivoting about the link relative to the housing.

11. The strapping head in accordance with claim 10 including friction reducing elements disposed in the housing well, in recesses formed in the housing, for contact with the bearing, the friction reducing elements being disposed along the second axis.

12. The strapping head in accordance with claim 10 including a seal disposed on the eccentric element configured for cooperating with the housing to enclose the bearing and well.

* * * * *